United States Patent [19]
Erlichman

[11] 3,805,282
[45] Apr. 16, 1974

[54] PHOTOGRAPHIC APPARATUS HAVING MECHANICAL INDEXING MEANS FOR A MULTI-LAMP FLASH UNIT

[75] Inventor: Irving Erlichman, Wayland, Mass.

[73] Assignee: Polaroid Corporation, Cambridge, Mass.

[22] Filed: Dec. 29, 1972

[21] Appl. No.: 319,535

[52] U.S. Cl.................. 354/144, 240/1.3, 240/37.1
[51] Int. Cl. ......................................... G03b 15/03
[58] Field of Search ............. 95/11 L, 11 R, 11.5 R; 240/1.3, 37.1

[56] References Cited
UNITED STATES PATENTS
2,485,404  10/1949  Noel............................. 240/1.3 UX

| | | | |
|---|---|---|---|
| 3,087,318 | 4/1963 | Oswold............................... 240/1.3 |
| 3,238,749 | 3/1966 | Reiber et al. .................... 240/1.3 X |
| 3,452,660 | 7/1969 | Schultz et al. ................. 240/37.1 X |

*Primary Examiner*—Robert P. Greiner

[57] ABSTRACT

A photographic apparatus, e.g., a camera, having a flash socket thereon for receiving a multi-lamp flash unit having a plurality of flash lamps arranged in a linear array. The socket is mounted for linear movement relative to a fixed lamp firing position on the apparatus and an indexing mechanism is provided for incrementally moving the socket relative to the fixed firing station to successively present each lamp in the array at the fixed position for firing.

22 Claims, 10 Drawing Figures

3,805,282

PATENTED APR 16 1974

PATENTED APR 16 1974

PHOTOGRAPHIC APPARATUS HAVING MECHANICAL INDEXING MEANS FOR A MULTI-LAMP FLASH UNIT

BACKGROUND OF THE INVENTION

1. Field of the Invention

The present invention relates to the field of photography and, more specifically, to photographic apparatus, e.g., cameras that are uniquely configured to receive and utilize multi-lamp flash units having a plurality of flash lamps arranged in a coplanar or linear array.

2. Description of the Prior Art

Disposable multi-lamp flash units have enjoyed remarkable consumer acceptance in recent years. The most widely known and commercially successful unit is the rotating "flash cube".

Further development of the multi-lamp concept has led to a second generation of units which feature a static linear array of lamps that are adapted to be fired in sequence by a variety of switching systems thereby eliminating the need to rotate the flash unit after each exposure.

Typically, these multi-lamp units include a base member which supports a coplanar array of flash lamps and individual lamp reflectors behind each lamp. The lamps may be arranged in a single row, i.e., a linear array, or in other embodiments, may be disposed in two or more interdigitated or parallel rows.

The base member is adapted to be connected to a socket on the camera which aligns all of the lamps in the array in a direction such that their light output is substantially parallel with the optic axis of the camera's objective lens.

The base member generally includes an insulating terminal board which supports a plurality of thin film conductive paths that are connected at one end to the lamp filament wires.

Generally, there is one common conductive path to which one end of all the lamp filaments are connected. The opposite end of the lamp filaments are each connected to their own individual conductive path. Accordingly, contact to any lamp in the array may be made by making contact, simultaneously, to the common path and the individual path.

The opposite ends of the conductive path are generally arranged in a linear row along the bottom edge of the insulating terminal board such that they may be engaged by conductive spring contacts in the camera socket to electrically couple the lamps to the camera's switching system and firing circuit.

Examples of the type of multi-lamp flash unit broadly described above may be found in U. S. Pat. Nos. 3,598,984 and 3,598,985, issued to Slomski and Harnden on Aug. 10, 1971; 3,608,451 issued to Kelem on Sept. 28, 1971; and 3,614,412 issued to Bellows on Oct. 19, 1971. Similar flash units are disclosed in U. S. Pat. Nos. 3,430,545 and 3,473,880 by Wich and 3,454,756 by Iwata.

Indexing or sequentially connecting each of the lamps in the array to the camera's flash firing circuit may be accomplished by numerous switching systems. For example, In U. S. Pat. No. 3,618,492, Ellin discloses an electronic switching circuit which automatically and sequentially connects the next lamp in the array to the firing circuit after the previous lamp has been fired by utilizing a combination of solid state switching and control subcircuits.

Other switch or indexing systems employ mechanical switching devices. For example, the Kelem patent (U.S. Pat. No. 3,608,451) discloses the use of a multi-contact switch having a rotary contact wiping member. The common lamp terminal is connected to one electrode of a battery within the camera. The individual lamp terminals are each connected to a separate contact on the switch. The contact wiping member is connected to the other battery electrode through a normally open flash ignition switch. After one lamp has been ignited, the flash ignition switch is reopened and the contact wiping member is rotated one station to connect the next lamp in the array to the flash firing circuit.

Indexing of the wiping member may conveniently be made responsive to some post exposure camera operation such as releasing the flash ignition switch or advancing the next film unit or frame to the exposure position.

The recent trend in amateur camera design toward more compact and miniaturized cameras brings to light a major deficiency in the static flash array concept. By arranging the lamps in an array which is located in a plane that is substantially normal to the objective lens axis, the position of the lamp that is to be ignited changes with each flash.

For example, let us assume that the multi-lamp flash unit is adapted to be mounted horizontally on the camera housing over the objective lens and includes linear array of five lamps. It is well known in the art of exposing color film by flash illumination that a flash lamp located directly over or in line with the objective lens axis produces an illumination pattern which fails to produce a true color rendition of a person's eyes. This effect is commonly referred to by those skilled in the art as "red-eye".

The "red-eye" problem is minimized by placing the igniting lamp slightly off-axis or to the right or left of the centerline of the objective lens. However, one must be careful not to place the lamp too far from the lens axis since this may result in uneven illumination of the camera's field of view.

Accordingly, there is a preferred off-axis location for the igniting flash lamp. Returning to our example of the five-lamp linear array, it will be obvious that only one of the five lamps in the array may occupy the preferred position. For instance, if the center lamp is located at the preferred position, the end lamps will either be too close or too far away from objective lens axis on a miniaturized camera. Even if the mulit-lamp unit is mounted vertically at the optimum distance to one side of the lens, the problem of uneven field illumination still exists and, for that matter, may possibly be accentuated.

SUMMARY OF THE INVENTION

The present invention provides a photographic apparatus which is adapted to receive and utilize a static multi-lamp flash unit and is uniquely configured to solve the lamp positioning problem outlined above.

The apparatus or camera includes a movably mounted flash unit socket and indexing means for progressively changing the position of the socket to successively locate each lamp in the coplanar array at a preferred firing position on the camera housing.

In a preferred embodiment, the camera housing includes a recess or channel disposed in a plane that is substantially normal to the axis of the camera's objective lens. The socket is configured to slide within the channel.

The socket is adapted to be spring biased in the direction of intended movement toward the preferred firing position. An escapement mechanism is provided and cooperates with an indexing rack on the socket for incrementally moving the socket one position after each exposure.

Heretofore, it is an object of the present invention to provide a photographic apparatus that is adapted to use a multi-lamp flash unit having a plurality of flash lamps disposed in a coplanar array and is uniquely configured to minimize the "red-eye" problem associated with color film exposed by flash illumination.

It is another object of the invention to provide a camera having a mechanical indexing system for progressively advancing lamps in the array to a preferred flash firing position.

It is yet another object of this invention to provide a photographic apparatus which includes a housing having a fixed position at which any one of a plurality of lamps in a coplanar array is adapted to be located for firing; a socket, for receiving the multi-lamp flash unit, being mounted for linear movement relative to the firing position; and indexing means for incrementally moving the socket relative to the fixed firing position.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
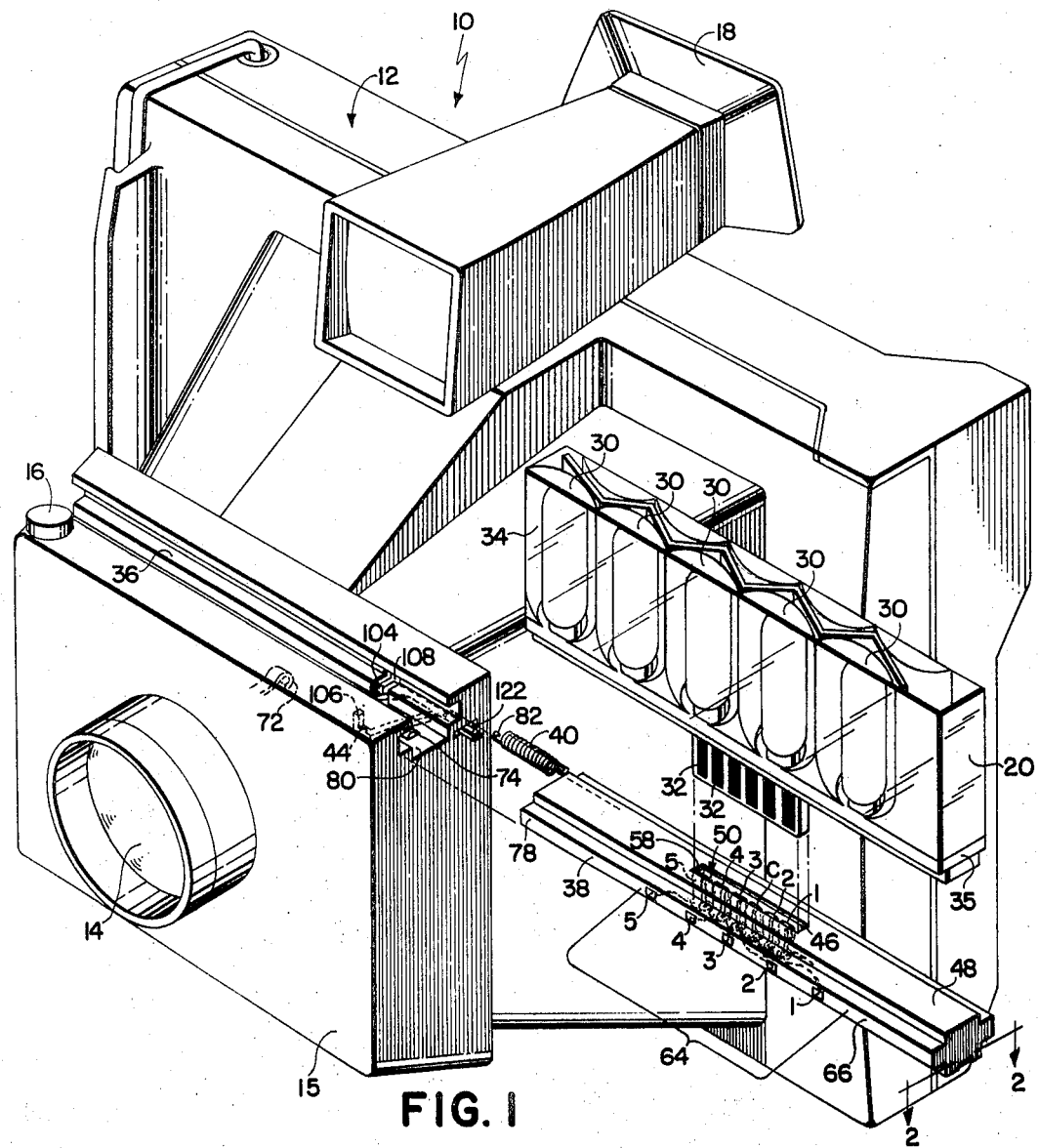
FIG. 1 is a perspective view, shown in exploded fashion, of a camera embodying the instant invention which features a mechanical indexing socket assembly for receiving a multi-lamp flash unit.

Referring now to FIG. 1 of the drawing, a camera which is configured to receive and utilize a multi-lamp flash unit incorporating a coplanar array of individual flash lamps is shown generally at 10.

Camera 10 may be a conventional or "self-developing" type of camera that includes a nonfolding or folding housing 12, an objective lens 14 mounted in a forward section 15 of the housing 12, a shutter release button or camera start/stop plunger 16, a direct or reflex viewing device 18, and a conventional flash lamp firing circuit (not shown). It will be understood that the camera may include other conventional items such as an exposure control photocell, a film advance lever, pressure-applying rollers (for self-developing cameras), etc.

An illustrative example of a multi-lamp flash unit that may be used with a camera embodying the instant invention is shown at 20 in FIGS. 1, 3, 4 and 5.

The flash unit comprises a thin elongated base member 22 (see FIG. 4) which includes an integrally formed, centrally depending terminal board section 24. Support member 22 is formed of any suitable electrically insulating material such as a plastic or a metal having an external insulating covering such as a baked enamel finish.

Disposed along the top edge 26 of member 22 in a side-by-side coplanar linear array are a plurality (5) of conventional, electrically ignitable, flash lamps 28. Behind each of the five lamps 28 is an individual dish-shaped reflector 30.

Electrical contact to the filament wires of each lamp 28 is made by contacting an appropriate set of lamp terminals 32 on the terminal board 24. In their most common form, terminals 32 comprise a series of individual electrically conductive paths which may be silk-screened on the insulating surface of base member 22.

One end of each of the filament wires is connected to a common conductive path which shall be designated "C". The other end of each filament wire is connected to an individual conductive path which shall be designated by numbers 1–2–3–4–5 to correspond to the five lamps comprising the linear array.

Figure 4:
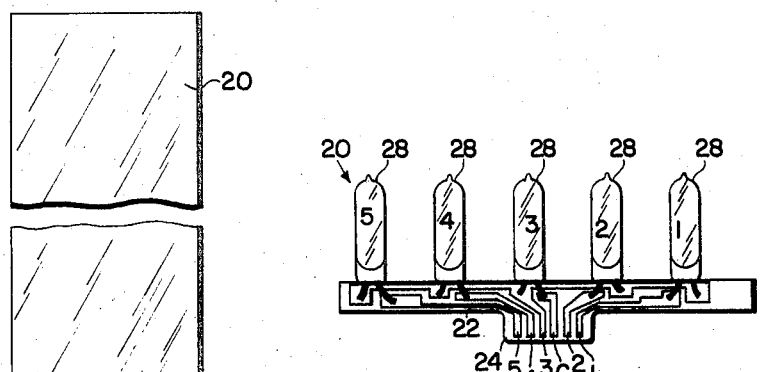
FIG. 4 is an elevational view of the base and terminal board of a typical multi-lamp flash unit with which the instant invention is adapted to be used.

The lamp terminals 32 are arranged vertically in side-by-side arrangement along the bottom edge of the terminal board 24. As best shown in FIG. 4, reading from left to right, the terminals are 5–4–3–C–2–1. To make electrical contact to lamp "1", lamp terminals 1 and C are engaged. Lamp 2 may be ignited by contacting terminals 2 and C etc.

The flash unit 20 also includes a transparent cover 34 enclosing the lamps 28 and their respective reflectors 30 and lower cover 35 enclosing the upper elongated portion of the flash unit base 22. As shown in the illustrative embodiment, the flash unit includes a second set of five lamps and reflectors along with a second set of six lamp terminals disposed in back-to-back relation with the first array. After the first array of lamps have been sequentially ignited, the flash unit may be removed from its socket, reversed, and reinserted into the socket to connect the second array to the camera's flash firing circuit.

As best shown in FIG. 1, the flash unit 20 is adapted to be coupled to a socket assembly disposed on the forward housing section 15. This assembly comprises an elongated guide channel 36; a flash unit carrier 38 adapted to slide along channel 36, a carrier drive spring 40, and an indexing mechanism formed by a toothed rack 42 on the underside of carrier 38 and a cooperating escapement mechanism 44 disposed near one end of channel 36.

Channel 36 is preferably disposed on the camera housing such that it occupies a plane that is substantially normal to the optic axis of objective lens 14. The cross sectional shape of channel 36 is shown to be that of a cross for receiving the complementary shaped cross section of carrier 38. One skilled in the art will recognize that any suitably interlocking cross-sectional shape of the channel and carrier that will permit the carrier to slide within channel 36 in a direction that is substantially normal to the lens axis while inhibiting movement of the carrier relative to the channel about the two remaining orthogonal axes may be employed.

The carrier 38 may be formed of any suitable insulating material, such as plastic. It has a centrally disposed elongated socket opening 46 in its top surface 48 which communicates with a socket cavity 50 dimensioned to receive the terminal board section 24 of the flash unit base section 22.

Like the carrier 38, the socket opening 46 and cavity 50 are disposed in a plane that is substantially normal to the optic axis of objective lens 14.

As best shown in FIG. 4, cavity 50 is defined by a planar forward wall 52, a rear planar wall 54 spaced from and substantially parallel to forward wall 52, a planar bottom wall 56, and a pair of socket cavity end walls 58.

Disposed in a series of vertical channels 60 formed in forward wall 52 are a plurality of resilient spring contacts 62 which serve the dual purpose of releasably holding the terminal board 24 of the flash unit 20 in the socket cavity 50 and making electrical contact to the conductive paths 32 thereon.

In the preferred embodiment, there are six contacts which are geometrically disposed to be in alignment with the corresponding six conductive paths 32 on the terminal board. The curved faces of the six contacts 62 are normally biased to protrude into the center of cavity 50 and are configured to be displaced slightly rearwardly towards socket wall 52 by the terminal board 24 as it is inserted into cavity 50. The normal biasing force of contacts 62 urges the rear surface of terminal board 24 against the rear wall 54 of cavity 50 such that the rear wall 54 and the contacts 62 cooperate to releasably hold the terminal board in the socket 50 by means of frictional engagement. In the case of the dual array flash unit, the electrically insulating rear wall 54 also serves to electrically isolate the second set of conductive lamp terminals 32 on the back side of terminal board 24 from the spring contacts 62.

In order to maintain consistency throughout this disclosure, the spring contacts 62 will be designated by the numbers and letter 5–4–3–C–2–1 as viewed from left to right in FIG. 1.

The opposite ends of the spring contacts 62 are coupled to a series of fixed contacts disposed on two exterior surfaces of carrier 38. As best shown in FIG. 1, each spring contact (62) 5–4–3–2–1 is coupled to a corresponding fixed contact (64) designated 5–4–3–2–1, reading from left to right, which are spaced along a leading edge 66 of carrier 38. The common spring contact "C" is coupled to elongated continuous conductor or contact 68 which runs substantially the entire length of carrier 38 in a channel 70 on the underside thereof.

The various spring and fixed contacts (62, 64, 68) and the conductive paths interconnecting them within carrier 38 may be formed of any suitable conductive material such as copper or aluminum. The insulating properties of the carrier material serves to electrically isolate the contacts from one another.

It will be noted that the fixed contacts 64 along carrier edge 66 have been physically spaced from the common fixed contact 68 by the above-described structure to more advantageously arrange the contacts for mechanical indexing. Thus, the contacts 64 may be equally spaced in a linear array and have a logical sequence 5–4–3–2–1 that is not interrupted by the common contact 68.

In order to connect the fixed contacts 64 and 68 (common) on carrier 38 to the camera flash fire circuit, camera 10 is provided with a pair of fixedly mounted flash fire circuit terminals 72 and 74. As best shown in FIG. 4, fixed terminal 72 is mounted within the forward camera housing section 15 such that it protrudes into channel 36 in position to sequentially, frictionally engage and make electrical contact to each of the contacts 64 as the carrier 38 is advanced along channel 36. Fixed terminal 74 is disposed to protrude into channel 36 and channel 70 on the underside carrier such that it frictionally engages and makes continuous electrical contact to the common contact 68 on the underside of carrier 38.

Figure 3:
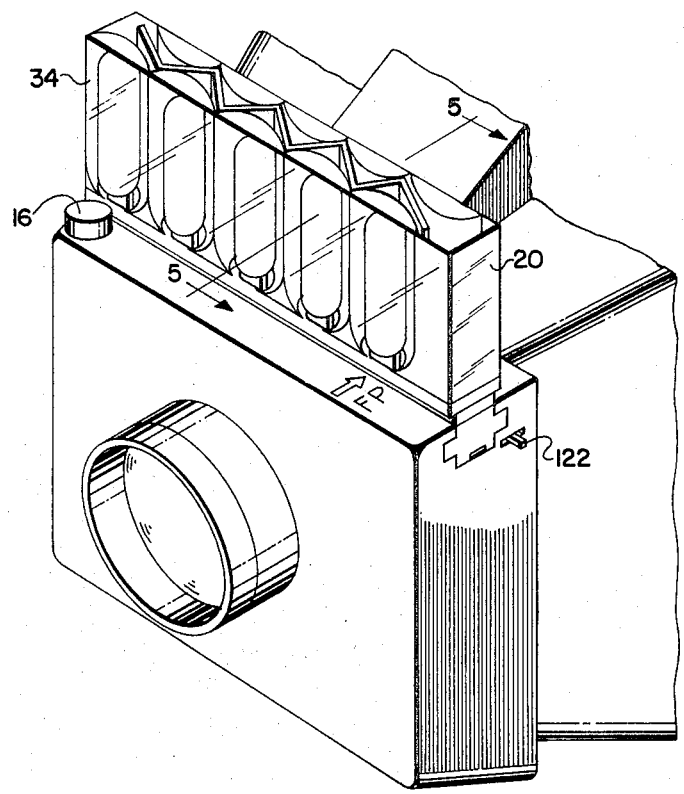
FIG. 3 is a perspective view of a section of the camera of FIG. 1 showing the socket assembly in its operative position for firing the first lamp in a linear flash array.

Assume now that the carrier 38 is fully inserted into channel 36 and a flash unit 20 is plugged into the terminal board cavity 50 as is shown in FIG. 3 of the drawings.

The first flash lamp "1" in the linear array is disposed at a preferably flash fire position off to the side of the lens axis. For the sake of clarity, the preferred flash position will be shown by an arrow on the top surface of housing section 15 designated "FP".

As noted earlier in the disclosure, it has been found that the "red-eye" problem associated with making portraits on color film by flash illumination may be readily solved by moving the lamp slightly to one side of the camera's optic axis.

With carrier 38 positioned in the channel to align lamp "1" with the "FP" firing position, the fixed terminal 72 is in engagement with and makes electrical contact to the first contact 64 on carrier 38 and the common terminal 74 makes electrical contact to the common contact 68 on the underside of the carrier. Thus, lamp "1" is electrically connected to the camera's flash fire circuit.

After lamp "1" has been fired, the carrier may be indexed one position to the right, as viewed in FIG. 3, such that second lamp "2" in the array is aligned with the flash position "FP" and the second fixed contact 64 on carrier 38 is in engagement with the firing terminal 72. Thus, by successively indexing the carrier 38 one step to the right (which equals the physical spacing between adjacent lamps) each of the lamps 28 in the array may be sequentially located at the preferred firing position "FP" and connected to the camera's firing circuit.

The means for indexing the carrier 38 relative to the fixed firing position "FP" include the carrier drive spring 40, the elongated toothed rack 42 on the underside of carrier 38, and the cooperating escapement mechanism 44 disposed near one end of channel 36.

Figure 5:
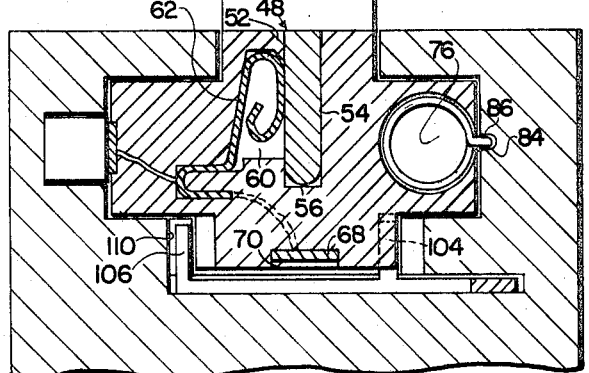
FIG. 5 is an enlarged cross-sectional view of the socket assembly of FIG. 3 illustrating its interior construction in more detail.

As best shown in FIG. 5, carrier 38 includes an internal circular bore 76, running along its length behind the cavity 50, for receiving the helical drive spring 40.

With the left end 78 of carrier 38 inserted into the right end 80 of channel 35 (as viewed in FIGS. 1 and 3) such that lamp "5" would be slightly to the right of the fixed firing position "FP", the left end 82 of the unstressed spring 40 is fixedly coupled internally to carrier 38 near its left end 78. The right end 84 of spring 40 is configured to extend through an opening 86 in carrier 38 that communicates with circular bore 76 and is fixedly connected to the rearwardmost wall 88 of channel 36 at 90.

By moving the carrier (to the left) to its fully inserted position in channel 36 (see FIG. 3) drive spring 40 is stressed and provides a driving force for advancing the carrier 38 along channel 36 to sequentially present the lamp 28 at the fixed firing position "FP".

Carrier movement and position along channel 36 is controlled by the escapement mechanism 44 and the rack 42 on the underside of carrier 38.

Figure 2:
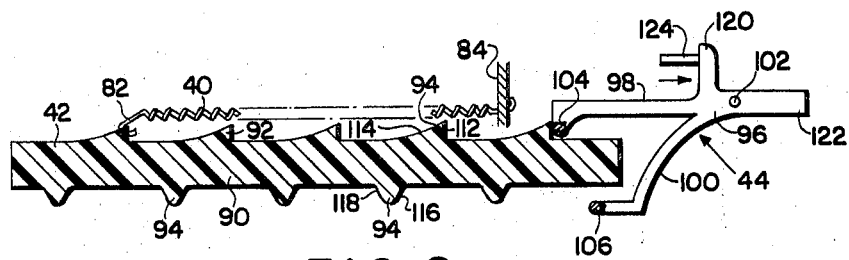
FIG. 2 is an elevational view of the underside of the socket assembly of FIG. 1 showing details of the indexing mechanism.
Figure 2A:
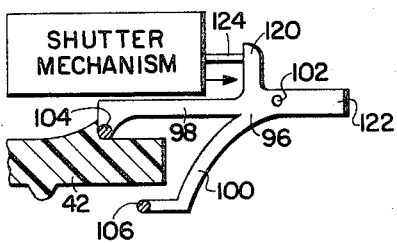
FIGS. 2a, 2b, 2c, 2d, and 2e are diagrammatic representations of alternate embodiments of actuating means for the indexing mechanism shown in FIG. 2.
Figure 2B:
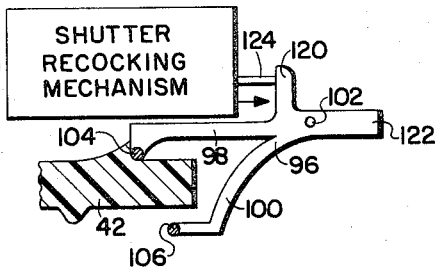
Figure 2C:
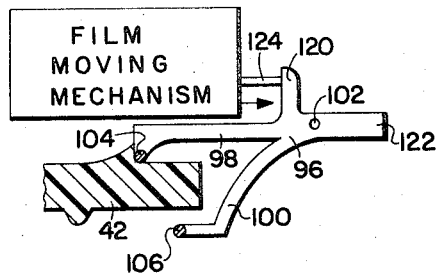
Figure 2D:
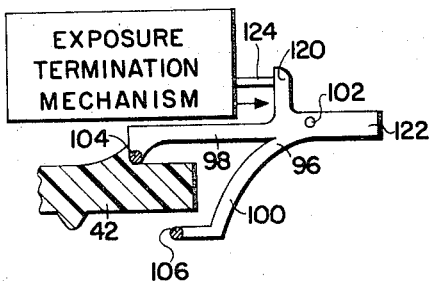
Figure 2E:
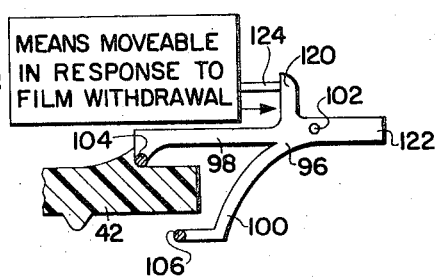

FIG. 2 shows a top view of the toothed rack taken along lines 2—2 of FIG. 1.

The rack is preferably integrally formed as part of carrier 38 and includes a center portion 90 having two sets of teeth 92 and 94 extending outwardly from the opposite edges of section 90 along its long dimension.

The escapement mechanism 44 that is adapted to be engaged with and disengaged from the two sets of teeth 92 and 94 to permit incremental movement of carrier 38 along channel 36 comprises a wishbone-shaped double pawl member 96 pivotally mounted at 97 within camera forward housing section 15 beneath channel 36.

Member 96 comprises a pair of relatively long arms 98 and 100 which extend outwardly from a central pivot point 102 and are spaced apart to straddle the two sets of teeth 92 and 94 on the edges of carrier 38. Integrally formed with ends of arms 98 and 100 are a pair of vertically disposed pawls 104 and 106 which extend upwardly through pair of openings 108 and 110 in the bottom wall of channel 36 so as to be positioned in proximity to the path of travel of teeth 92 and 94.

As best shown in FIG. 2, each tooth 92 includes a short leading planar face 112 disposed at substantially a right angle to the long edge of carrier 38 and an inclined or trailing camming surface 114. The second set of teeth 94 is interdigitated with respect to the first set of teeth 92 and they have a different shape in that both their leading end trailing surfaces 116 and 118 are inclined on slightly curved camming surface.

Member 96 also includes a pair of shorter actuating arms 120 and 122 extending outwardly from pivot point 102. With member 96 pivotally coupled to the underside of channel 36 as shown in FIG. 1, the first actuating arm 120 is completely enclosed by camera forward housing section 15 and the second arm 122 extends outwardly to the exterior of housing 15 through an opening 124 therein.

The internal actuating arm 120 is adapted to be engaged by structure within camera 10 to pivot member 96 in a proper predetermined timed or sequential relationship. More will be said about this later. The external actuating arm 122 is used to manually manipulate member 96 from the outside of the camera housing.

The pawl 104 on arm 98 is normally positioned in the path of travel of the leading planar face 112 of tooth 92. The bias of drive spring 40 urges the carrier to the right (as viewed in FIG. 2) and face 112 of the first tooth 92 bears against pawl 104 which serves as a stop to hold carrier 38 at a fixed position within channel 36. It will be noted that pawl 106 is disposed slightly outside the path of travel of the leading face 116 of the first tooth 92 on the opposite side of the carrier.

With a flash unit 20 mounted on carrier 38 and pawl 104 in engagement with the first tooth 92, lamp "1" is located at the fixed flash fire position "FP" and the flash unit terminals "1" and "C" are electrically connected to the camera's flash fire circuit.

After flash ignition the escapement mechanism member 96 is pivoted in a clockwise direction about pivot 102. This causes arms 98 and 100 to pivot in a clockwise direction thereby moving pawl 104 out of engagement and the path of travel of the first tooth 92 and moving pawl 106 into the path of travel of the first tooth 92.

The carrier 38 begins to index or move to the right under the influence of drive spring 40. The leading camming face 116 of the first tooth 94 engages pawl 106 which slides along the inclined face causing it to move out of the path of travel of tooth 94. Accordingly, member 96 is pivoted in a counterclockwise direction about pivot 102 and pawl 104 automatically moves back into the path of travel of the leading face 112 of the second tooth 94. The drive spring continues to advance the carrier to the right until pawl 104 engages the second tooth 94 and stops the carrier in position to locate lamp "2" at the flash fire position "FP".

The sequence of steps is repeated until all of the lamps 28 have been fired. The flash unit is then reversed in the socket or is replaced with a new flash unit, and the carrier 38 is moved to the left to return it to its fully inserted position. It will be noted that the trailing edge camming surfaces 114 and 118 on teeth 92 and 94 cause the escapement mechanism 44 to pivot in a reciprocating manner about pivot 102 to allow the carrier to be returned to its fully inserted position with substantially continuous motion.

As noted earlier, the escapement mechanism 44 may be operated manually by actuating member 122. Manual operation is especially useful when using a flash array having some fired lamps therein. By manually indexing the carrier, the next unused lamp on the array may be positioned at the flash fire position "FP".

Normally, however, the escapement mechanism 44 is actuated by a member within camera 10. For example, if the camera is provided with a two bladed shutter (a first blade for unblocking the exposure aperture behind the lens and a second or closing blade for covering the aperture), the closing blade may be provided with an extension 124 (see FIG. 2) which engages and moves escapement actuating arm 120 to the right (as viewed in FIG. 2) during the course of its movement. It will be noted, however, that other mechanisms within camera 10 may be utilized to engage and move actuating arm 120 and that extension 124 is meant to be illustrative of all such mechanisms.

Since the escapement mechanism is adapted to be actuated between successive exposures, there are a number of mechanisms within the camera that may be provided with an extension 124 for engaging actuating arm 120 (See FIGS. 2a, 2b, 2c, 2d, and 2e).

By using the closing shutter blade to actuate escapement 44, flash indexing begins during the exposure termination phase of operation. In another embodiment, a mechanism for recocking the shutter may be used to actuate escapement 44. In still another embodiment, a film advance mechanism or means responsive to film advance (in the case of a self-developing camera wherein the film unit is manually pulled out of the camera) may be utilized to move actuating arm 120. The last two embodiments are examples of flash indexing during a post-exposure phase of camera operation.

Since certain changes may be made in the above apparatus with departing from the scope of the invention herein involved, it is intended that all matter contained in the above description or shown in the accompanying drawings shall be interpreted as illustrative and not in a limiting sense.

What is claimed is:

1. Photographic apparatus for use with a multi-lamp flash unit of the type having a plurality of flash lamps disposed in a linear array, said photographic apparatus comprising:
    a housing;
    a fixed firing position on said housing at which any one of the lamps in a multi-lamp flash unit is adapted to be located for firing;
    a socket for receiving and supporting a multi-lamp flash unit, said socket being mounted on said housing for linear movement relative to said fixed firing position; and
    indexing means for incrementally moving said socket relative to said fixed firing position such that each of the lamps in a multi-lamp flash unit supported by said socket may be presented at said fixed position for firing.

2. Photographic apparatus as defined in claim 1 wherein said apparatus has an optic axis and said socket is configured to support a multi-lamp flash unit on said housing such that the light output of the linear array of lamps will be directed in a direction that is substantially parallel to said optic axis, and said socket is mounted on said housing for linear movement in a direction that is substantially normal to said optic axis.

3. Photographic apparatus as defined in claim 1 further including actuating means responsive to the operation of said apparatus for actuating said indexing means to incrementally move said socket relative to said fixed firing position.

4. Photographic apparatus as defined in claim 3 wherein said actuating means includes a portion of a shutter mechanism.

5. Photographic apparatus as defined in claim 3 wherein said actuating means includes a portion of means for recocking a shutter.

6. Photographic apparatus as defined in claim 3 wherein said actuating means includes means for moving a film unit within said apparatus.

7. Photographic apparatus as defined in claim 3 wherein said actuating means is responsive to withdrawing a film unit from said apparatus.

8. Photographic apparatus as defined in claim 1 wherein said housing has a linear channel therein for receiving and supporting said socket for slidable movement along said channel relative to said fixed firing position.

9. Photographic apparatus as defined in claim 8 wherein said indexing means includes means for biasing said socket for movement along said channel towards said fixed firing position, means including a row of teeth integrally formed with said socket, and an escapement member pivotally mounted on said housing such that it extends into said channel, said escapement member being pivotally mounted for movement between a first position wherein said escapement member engages one of said teeth in said row to hold said socket and thereby prevent motion of said socket by said biasing means and second position wherein said escapement member is out of engagement with said one tooth to permit said socket to be moved by said biasing means.

10. Photographic apparatus as defined in claim 9 further including a second row of teeth on said socket for moving said escapement member from said second position to said first position in response to one increment of movement of said socket towards said fixed firing position.

11. Photographic apparatus as defined in claim 9 wherein said biasing means includes a spring located within said socket, one end of said spring being coupled to said socket and the opposite end of said spring being coupled to said housing.

12. Photographic apparatus for use with a multi-lamp flash unit of the type including a plurality of flash lamps disposed in a coplanar array and an insulating lamp terminal board having a row of conductive lamp terminals thereon connected to the lamps such that electrical contact may be made to any lamp in the array by simultaneously contacting an individual lamp terminal and a common lamp terminal, said apparatus comprising:
    a housing;
    a lamp firing station mounted at a fixed position on said housing and including a pair of electrical contacts, forming part of a lamp firing circuit, to which an individual lamp terminal and the common terminal are adapted to be connected to couple an individual lamp in a coplanar array to the firing circuit;
    a socket for receiving and supporting a multi-lamp flash unit, said socket being mounted on said housing for linear movement relative to said pair of electrical contacts at said firing station;
    conductive means associated with said socket for making simultaneous and individual electrical contact to all of the lamp terminals of a multi-lamp flash unit supported by said socket and for successively interconnecting each individual lamp terminal and the common lamp terminal to said pair of electrical contacts at said firing station in response to incrementally and linearly moving said socket relative to said pair of electrical contacts; and
    indexing means for incrementally moving said socket relative to said pair of electrical contacts to successively couple each of the lamps in the linear array to said pair of contacts through its individual terminal, the common terminal, and said conductive means associated with said socket.

13. Photographic apparatus as defined in claim 12 further including actuating means for actuating said indexing means to incrementally move said socket relative to said pair of contacts.

14. Photographic apparatus as defined in claim 12 further including an objective lens mounted on said housing, said objective lens having an optic axis, said socket being configured to support a multi-lamp flash unit such that the light output of the lamps is directed in a direction substantially parallel to said optic axis, said socket also being mounted on said housing for linear movement in a direction that is substantially normal to said optic axis.

15. Photographic apparatus as defined in claim 14 wherein said lamp firing station is to one side of said optic axis.

16. Photographic apparatus as defined in claim 12 wherein said indexing means is adapted to be actuated manually.

17. Photographic apparatus as defined in claim 12 wherein said indexing means is adapted to be actuated in response to an operation of the apparatus.

18. Photographic apparatus as defined in claim 17 wherein said operation includes terminating the exposure of a film unit within said housing.

19. Photographic apparatus as defined in claim 17 wherein said operation includes moving film from an exposure position within said housing.

20. Photographic apparatus as defined in claim 12 wherein said housing includes a linear channel therein and said socket includes a carrier configured to slideably move within said channel relative to said firing station.

21. Photographic apparatus as defined in claim 20 wherein said indexing means includes means biasing said carrier for movement in one direction along said channel, a plurality of teeth integrally formed along the length of said carrier, and an escapement member mounted on said housing so as to extend into said channel and cooperate with said teeth to alternatively stop and permit incremental movement of said carrier by said biasing means.

22. Photographic apparatus for use with a multilamp flash unit of the type including a plurality of flash lamps disposed in a coplanar array and an insulating lamp terminal board having a row of conductive lamp terminals thereon connected to the lamps such that electrical contact may be made to any lamp in the array by simultaneously contacting an individual lamp terminal and a common lamp terminal, said apparatus comprising:

a housing;

a lamp firing station mounted at a fixed position on said housing and including a pair of electrical contacts, forming part of a lamp firing circuit, to which an individual lamp terminal and the common terminal are adapted to be connected to couple an individual lamp in a coplanar array to the firing circuit;

a socket for receiving and supporting a multi-lamp flash unit, said socket being mounted on said housing for linear movement relative to said pair of electrical contacts at said firing station, said socket including conductive means therein cooperating with portions of said socket for releasably holding a multi-lamp flash unit in said socket and for making simultaneous and individual electrical contact to all of the lamp terminals of a multi-lamp flash unit supported by said socket and for successively interconnecting each individual lamp terminal and the common lamp terminal to said pair of electrical contacts at said firing station in response to incrementally and linearly moving said socket relative to said pair of electrical contacts; and indexing means for incrementally moving said socket relative to said pair of electrical contacts to successively couple each of the lamps in the linear array to said pair of contacts through its individual terminal, the common terminal and said conductive means associated with said socket.

* * * * *